US012622427B2

(12) United States Patent (10) Patent No.: US 12,622,427 B2

Ito et al. (45) Date of Patent: May 12, 2026

(54) INFORMATION PROCESSOR FOR PREDICTING A RISK OF PEST DAMAGE TO PRODUCE

(71) Applicant: BAYER CROPSCIENCE K.K., Tokyo (JP)

(72) Inventors: Satoshi Ito, Tokyo (JP); Asako Mori, Tokyo (JP); Takahiro Sassa, Tokyo (JP)

(73) Assignee: BAYER CROPSCIENCE K.K., Tokyo (JP)

( * ) Notice: Subject to any disclaimer, the term of this patent is extended or adjusted under 35 U.S.C. 154(b) by 605 days.

(21) Appl. No.: 17/911,632

(22) PCT Filed: Mar. 12, 2021

(86) PCT No.: PCT/JP2021/010185

§ 371 (c)(1),
(2) Date: Sep. 14, 2022

(87) PCT Pub. No.: WO2021/187387

PCT Pub. Date: Sep. 23, 2021

(65) Prior Publication Data

US 2023/0115408 A1 Apr. 13, 2023

(30) Foreign Application Priority Data

Mar. 16, 2020 (JP) ................................ 2020-045097

(51) Int. Cl.
*A01M 7/00* (2006.01)
*A01M 21/04* (2006.01)
*G06Q 50/02* (2024.01)

(52) U.S. Cl.
CPC .......... *A01M 7/0089* (2013.01); *A01M 21/04* (2013.01); *G06Q 50/02* (2013.01)

(58) Field of Classification Search
CPC .......... A01M 1/00–99/00; G06Q 10/00–50/00
(Continued)

(56) References Cited

U.S. PATENT DOCUMENTS 9,563,852 B1* 2/2017 Wiles ................... A01B 79/005
10,607,171 B1* 3/2020 Dobbins .......... G06Q 10/06315
(Continued)

FOREIGN PATENT DOCUMENTS

AU 2002317148 B2 9/2007
CN 101946653 A 1/2011
(Continued)

*Primary Examiner* — Alan S Miller

(74) *Attorney, Agent, or Firm* — Harness, Dickey & Pierce, P.L.C.

(57) ABSTRACT

Problem To provide an information processor capable of effectively reducing a risk of pest damage to produce. Solution An information processor 10 predicts a risk of pest damage to produce, the information processor comprising: a prediction unit for predicting an effect of reducing the pest damage risk for each of a plurality of countermeasure candidates for changing at least one influencing parameter affecting the pest damage risk; and a selection unit for selecting a countermeasure from among the plurality of countermeasure candidates while prioritizing a countermeasure having a higher effect of reducing the pest damage risk, on the basis of a result of predicting the effect of reducing the pest damage risk afforded by the prediction unit.

7 Claims, 3 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 2010/0029725 | A1* | 2/2010 | Cosgrove | C12N 15/8286 |
| | | | | 514/408 |
| 2013/0174040 | A1* | 7/2013 | Johnson | G06Q 50/02 |
| | | | | 715/733 |
| 2014/0067745 | A1* | 3/2014 | Avey | G06Q 10/04 |
| | | | | 706/46 |
| 2016/0253595 | A1* | 9/2016 | Mathur | G06F 30/00 |
| | | | | 706/12 |
| 2018/0322426 | A1* | 11/2018 | Schmaltz | G06Q 10/0637 |
| 2019/0026666 | A1* | 1/2019 | Zhu | G05B 19/41875 |
| 2019/0166752 | A1* | 6/2019 | Sidoti | G05D 1/0094 |
| 2020/0265527 | A1* | 8/2020 | Rose | G06Q 50/02 |
| 2021/0029866 | A1* | 2/2021 | Placella | G06Q 10/04 |
| 2022/0076141 | A1* | 3/2022 | Sozzi Sabatini | G06N 5/02 |
| 2022/0076843 | A1* | 3/2022 | Masculo | G06F 40/284 |
| 2022/0087246 | A1* | 3/2022 | Ghosh | G06Q 50/163 |
| 2023/0034337 | A1* | 2/2023 | Gorski | G07F 17/323 |

FOREIGN PATENT DOCUMENTS

| | | | |
|---|---|---|---|
| EP | 3550498 | A1 | 10/2019 |
| JP | 2015154732 | A | 8/2015 |
| KR | 20180054352 | A | 5/2018 |

* cited by examiner

[Fig. 1]
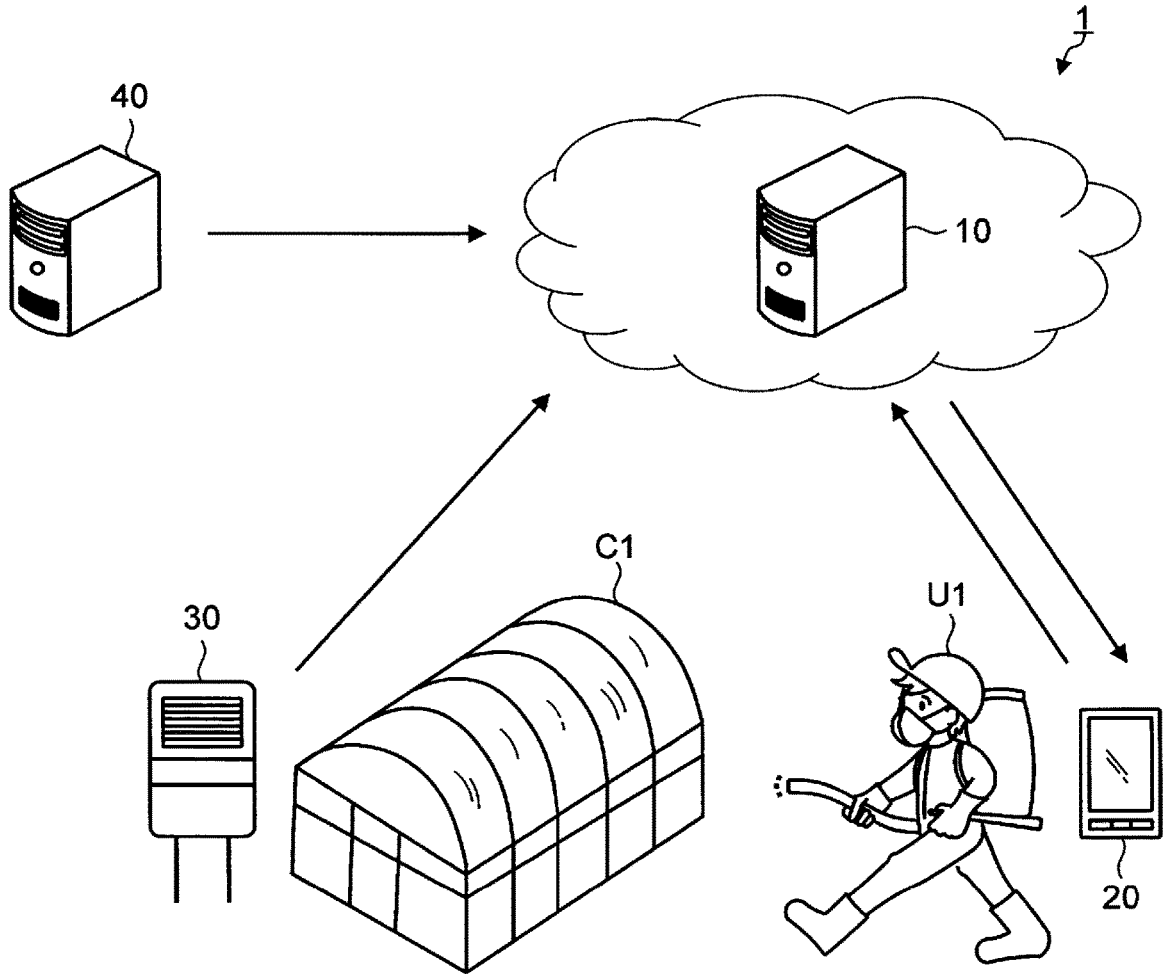

[Fig. 2]
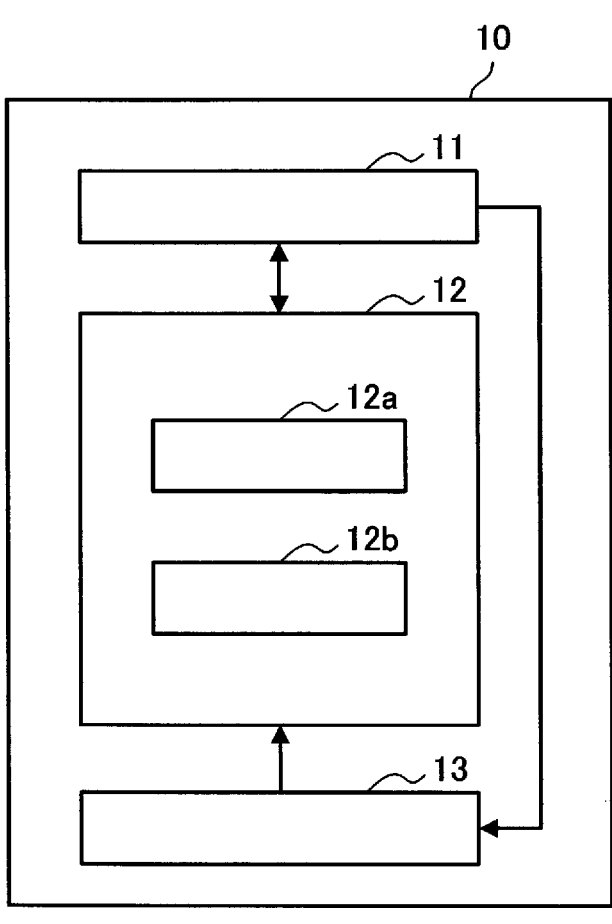

[Fig. 3]
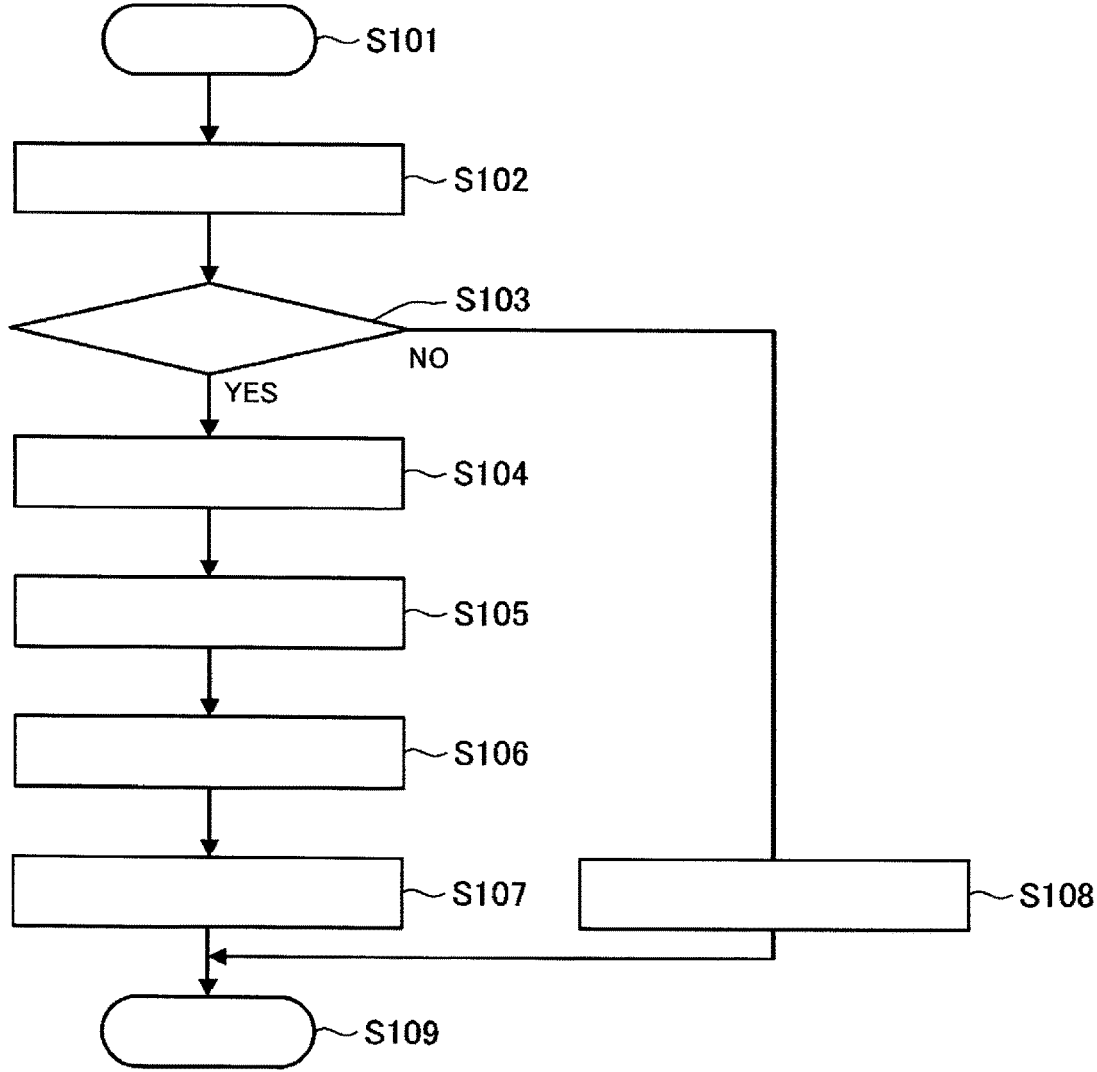
[Fig. 4]
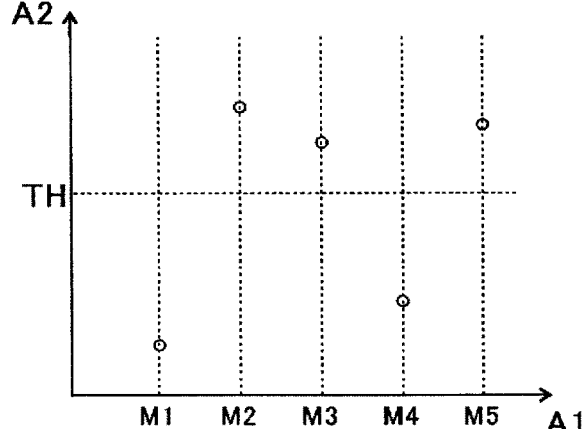

INFORMATION PROCESSOR FOR PREDICTING A RISK OF PEST DAMAGE TO PRODUCE

CROSS-REFERENCE TO RELATED APPLICATIONS

This application is a U.S. national stage filing under 35 U.S.C. § 371 of International Application No. PCT/JP2021/010185, filed on Mar. 12, 2021, which claims the benefit of, and priority to, Japanese Patent Application No. 2020-045097, filed on Mar. 16, 2020. The entire disclosure of each of the above applications is incorporated herein by reference.

TECHNICAL FIELD

The present invention relates to an information processor.

BACKGROUND ART

Agricultural technology has been proposed for protecting produce from pest damage (i.e., disease damage, which is damage to the produce caused by disease, or insect damage, which is damage to the produce caused by insects). Technology such as this involves predicting a pest damage risk, which is the risk of an outbreak of pest damage (e.g., see Patent Document 1).

CITATION LIST

Patent Literature

[PTL 1] JP 2004-185222 A

SUMMARY OF THE INVENTION

Problem to be Solved by the Invention

A predicted pest damage risk is notified to a user (i.e., a farmer) and used for protecting the produce from pest damage. However, there is a wide range of actions which may be undertaken by the user in response to a notification of the results of the pest damage risk prediction. It may therefore be difficult for the user to select an action for effectively reducing the pest damage risk. As a result, it may be difficult to effectively reduce the risk of pest damage to the produce.

In light of this problem, the objective of the present invention lies in providing an information processor capable of effectively reducing the risk of pest damage to produce.

Means for Solving the Problem

In order to solve the abovementioned problem, an information processor predicts a risk of pest damage to produce, the information processor comprising: a prediction unit for predicting an effect of reducing the pest damage risk for each of a plurality of countermeasure candidates for changing at least one influencing parameter affecting the pest damage risk; and a selection unit for selecting a countermeasure from among the plurality of countermeasure candidates while prioritizing a countermeasure having a higher effect of reducing the pest damage risk, on the basis of a result of predicting the effect of reducing the pest damage risk afforded by the prediction unit.

Advantage of the Invention

The present invention makes it possible to effectively reduce a risk of pest damage to produce.

BRIEF DESCRIPTION OF DRAWINGS

FIG. 1 is a schematic diagram showing an outline configuration of an information processing system according to a mode of embodiment of the present invention.

FIG. 2 is a block diagram showing an example of a functional configuration of an information processing server according to a mode of embodiment of the present invention.

FIG. 3 is a flowchart showing an example of a processing flow relating to a pest damage risk prediction made by the information processing server according to a mode of embodiment of the present invention.

FIG. 4 is a schematic diagram showing an example of a result of predicting an effect of reducing a pest damage risk afforded by a prediction unit according to a mode of embodiment of the present invention.

MODE OF EMBODIMENT OF THE INVENTION

A preferred mode of embodiment of the present invention will be described in detail below with reference to the appended drawings. Dimensions, materials and other specific numerical values, etc. indicated in this mode of embodiment are merely an illustration to help with an understanding of the invention, and they do not limit the present invention unless specifically stated otherwise. It should be noted that components having substantially the same function or configuration in the present specification and drawings bear the same reference symbols and a duplicate description thereof will not be given, and furthermore, components which are not directly related to the present invention are omitted from the drawings.

Configuration of Information Processing System

The configuration of an information processing system 1 according to a mode of embodiment of the present invention will be described with reference to FIG. 1.

FIG. 1 is a schematic diagram showing an outline configuration of the information processing system 1.

As shown in FIG. 1, the information processing system 1 comprises an information processing server 10, a user terminal 20, a sensor device 30, and a weather information server 40. The information processing server 10, user terminal 20, sensor device 30 and weather information server 40 are capable of communicating via a wireless communication network. The information processing system 1 is a system for supporting cultivation of produce at a cultivation site C1 by a user U1, who is a farmer. It should be noted that FIG. 1 shows an example in which the cultivation site C1 is a plastic greenhouse, but the cultivation site C1 may equally be a cultivation site other than a plastic greenhouse (e.g., an exposed cultivation site which is not covered, etc.).

It should be noted that the following description relates to a case in which the information processing server 10 corresponds to an example of the information processor according to the present invention, but the information processor according to the server 10 (e.g., the user terminal 20). Furthermore, the function of the information processor according to the present invention may equally be implemented by a plurality of devices (e.g., the information processing server 10 and the user terminal 20). The function of the information processor according to the present invention may equally be implemented by means of cloud computing, for example.

Using information acquired from each of the devices, namely the user terminal 20, the sensor device 30 and the weather information server 40, the information processing server 10 sends to the user terminal 20 information of value in the cultivation of produce at the cultivation site C1. The information sent from the information processing server 10 is displayed by means of the user terminal 20 in order to notify the user U1.

Specifically, the information processing server 10 uses the information acquired from each of the devices to predict a risk of pest damage to the produce, and sends a result of a pest damage risk prediction to the user terminal 20. The pest damage risk is the risk of an outbreak of pest damage. Furthermore, the information processing server 10 may also send information acquired from the sensor device 30 (specifically, various types of detection data relating to the cultivation site C1 detected by means of the sensor device 30) to the user terminal 20. Note that the detailed configuration of the information processing server 10 will be described later.

The user terminal 20 is an information processing terminal (specifically a smartphone) which is used by the user U1. It should be noted that FIG. 1 shows an example in which the user terminal 20 is a smartphone, but the user terminal 20 may equally be an information processing terminal other than a smartphone (e.g., a tablet terminal or a stationary personal computer, etc.).

The user terminal 20 has the function of receiving input operations performed by the user U1, and sends input information, which is information input by the user U1, to the information processing server 10. The input information from the user U1 includes, for example, information indicating the address of the cultivation site C1, the size of the cultivation site C1, the type of produce, a planting density of the produce, a cultivation start timing, a harvesting timing, or a history of application of chemical agents (e.g., agrochemicals), etc. Furthermore, the user terminal 20 has the function of displaying information visually, and displays the information received from the information processing server 10.

The sensor device 30 is installed within the cultivation site C1 and comprises a plurality of sensors. For example, the sensor device 30 comprises: a humidity sensor for detecting humidity within the cultivation site C1; a temperature sensor for detecting an air temperature within the cultivation site C1; a carbon dioxide concentration sensor for detecting a concentration of carbon dioxide within the cultivation site C1; or a solar radiation sensor for detecting an amount of solar radiation within the cultivation site C1, etc.

The sensor device 30 sends the detection data from the sensors provided in the sensor device 30 to the information processing server 10. For example, the sensors detect various physical quantities at detection times separated by preset time intervals, and the sensor device 30 sends the detection data from the sensors to the information processing server 10 at the detection times.

The weather information server 40 provides weather information to an external device. Specifically, the weather information server 40 sends weather information in the region including the cultivation site C1 to the information processing server 10 in accordance with a request from the information processing server 10. The weather information is information relating to weather, and includes, for example, information indicating the temperature of the external air (i.e., the external air temperature), the humidity of the external air, the amount of solar radiation, or rainfall, etc.

Configuration of Information Processing Server

The configuration of the information processing server 10 according to a mode of embodiment of the present invention will be described with reference to FIG. 2.

The information processing server 10 includes, for example: a CPU (central processing unit) which is an arithmetic processing device; a ROM (read-only memory) which is a memory element for storing programs and computation parameters, etc. used by the CPU; and a RAM (random access memory) which is a memory element for temporarily storing parameters, etc. which vary appropriately for implementation by the CPU, etc.

FIG. 2 is a block diagram showing an example of a functional configuration of the information processing server 10.

As shown in FIG. 2, the information processing server 10 comprises, for example, a communication unit 11, a control unit 12 and a memory unit 13. It should be noted that the communication unit 11 corresponds to an example of an output unit according to the present invention.

The communication unit 11 communicates with the devices in the information processing system 1. Specifically, the communication unit 11 receives information sent from these devices, namely the user terminal 20, the sensor device 30 and the weather information server 40, and outputs the information acquired to the control unit 12 and the memory unit 13. Furthermore, the communication unit 11 sends information generated by means of the control unit 12 to the user terminal 20.

The control unit 12 performs various types of processing for generating the information sent to the user terminal 20. As shown in FIG. 2, the control unit 12 includes a prediction unit 12*a* and a selection unit 12*b* which function in collaboration with a program, for example.

The prediction unit 12*a* predicts the risk of pest damage to the produce. Specifically, the prediction unit 12*a* predicts the risk of pest damage to the produce by using a prediction model learned in advance. The prediction model outputs the risk of pest damage to the produce when information sent from each of the devices, namely the user terminal 20, sensor device 30 and weather information server 40, is input. The prediction model may be constructed in accordance with an existing algorithm such as a support vector machine, or it may be a time-series model.

In collaboration with the prediction unit 12*a*, the selection unit 12*b* performs processing to cause the user to take action to effectively reduce the pest damage risk. Specifically, the processing performed by the prediction unit 12*a* to cause the user to take action to effectively reduce the pest damage risk involves predicting the effect of reducing the pest damage risk for each of a plurality of countermeasure candidates for changing at least one influencing parameter affecting the pest damage risk. The selection unit 12*b* then selects a countermeasure from among the plurality of countermeasure candidates while prioritizing a countermeasure having a higher effect of reducing the pest damage risk, on the basis of a result of predicting the effect of reducing the pest damage risk afforded by the prediction unit 12*a*. By this means, the user U1 can be made to take action that will cause a change in an influencing parameter for effectively reducing the pest damage risk (in other words, action to effectively reduce the pest damage risk). The risk of pest damage to the produce can therefore be effectively reduced. The details of the processing relating to this pest damage risk prediction made by the information processing server 10 will be described later.

The memory unit 13 stores information used in the processing performed by the control unit 12. Specifically, the memory unit 13 stores information sent from each of the devices, namely the user terminal 20, sensor device 30 and weather information server 40.

Operation of the Information Processing Server

The operation of the information processing server 10 according to a mode of embodiment of the present invention will be described with reference to FIG. 3 and FIG. 4.

FIG. 3 is a flowchart showing an example of a processing flow relating to a pest damage risk prediction made by the information processing server 10. The processing flow shown in FIG. 3 is started by means of the information processing server 10 at preset time intervals, for example. Step S101 and step S109 in FIG. 3 correspond to the start and end, respectively, of the processing flow shown in FIG. 3.

When the processing flow shown in FIG. 3 is started, the prediction unit 12a first of all predicts the risk of pest damage to the produce in step S102.

In step S102, the prediction unit 12a predicts the risk of pest damage to the produce (e.g., a numerical value indicating the possibility of an outbreak of pest damage one day later or two days later) by using: the input information from the user U1 acquired from the user terminal 20 (e.g., information indicating the address of the cultivation site C1, the size of the cultivation site C1, the type of produce, the planting density of the produce, the cultivation start timing, the harvesting timing, or the history of application of chemical agents, etc.); the sensor information acquired from the sensor device 30 (e.g., information indicating humidity within the cultivation site C1, the air temperature within the cultivation site C1, the concentration of carbon dioxide within the cultivation site C1, or the amount of solar radiation within the cultivation site C1, etc.); and the weather information acquired from the weather information server 40 (e.g., information indicating the external air temperature, humidity of the external air, amount of solar radiation, or rainfall, etc.); and also by using the prediction model. It should be noted that the prediction unit 12a may also predict the risk of pest damage to the produce while taking account of control performed automatically by each piece of equipment (e.g. heating equipment, etc.) capable of affecting the environment within the cultivation site C1.

In step S103 following step S102, the control unit 12 judges whether or not the pest damage risk is higher than a reference. If the pest damage risk is deemed to be higher than the reference (step S103/YES), the processing flow advances to step S104, and processing is performed to cause the user U1 to take action to effectively reduce the pest damage risk (specifically, step S104 to step S107). If the pest damage risk is deemed to be lower than the reference (step S103/NO), the processing flow advances to step S108, the communication unit 11 sends the result of predicting the pest damage risk to the user terminal 20, and the processing flow shown in FIG. 3 ends.

The reference in step S103 is used to judge whether or not there is a need to cause the user U1 to take action to protect the produce from pest damage. That is to say, if the pest damage risk is deemed to be higher than the reference, it can be judged that there is a need to cause the user U1 to take action to protect the produce from pest damage. For example, the control unit 12 judges that the pest damage risk is higher than the reference if a numerical value of the predicted pest damage risk is higher than a reference value.

If the judgement is YES in step S103, then in step S104 the prediction unit 12a determines the plurality of countermeasure candidates for changing at least one influencing parameter affecting the pest damage risk.

A countermeasure in the present specification governs which influencing parameter is changed and the manner in which it is changed. Moreover, the prediction unit 12a may also determine a countermeasure for changing a plurality of influencing parameters as a candidate.

The influencing parameters may include an environmental parameter relating to the environment at the cultivation site C1 of the produce, for example. The humidity within the cultivation site C1, the air temperature within the cultivation site C1, the concentration of carbon dioxide within the cultivation site C1, or the amount of solar radiation within the cultivation site C1, etc. may be used as the environmental parameter, for example. Moreover, the environmental parameter may be subject to detection by the sensor device 30, or it may be a parameter which is not subject to detection by the sensor device 30 (e.g., soil moisture at the cultivation site C1, etc.).

A countermeasure which raises humidity by 5%, a countermeasure which raises humidity by 10%, a countermeasure which lowers humidity by 5%, and a countermeasure which lowers humidity by 10%, etc. are examples of countermeasures for changing the humidity within the cultivation site C1.

A countermeasure which raises the air temperature by 1° C., a countermeasure which raises the air temperature by 2° C., a countermeasure which lowers the air temperature by 1° C., and a countermeasure which lowers the air temperature by 2° C., etc. are examples of countermeasures for changing the air temperature within the cultivation site C1.

A countermeasure which raises the concentration of carbon dioxide by 5%, a countermeasure which raises the concentration of carbon dioxide by 10%, a countermeasure which lowers the concentration of carbon dioxide by 5%, and a countermeasure which lowers the concentration of carbon dioxide by 10%, etc. are examples of countermeasures for changing the concentration of carbon dioxide within the cultivation site C1.

A countermeasure which raises the amount of solar radiation by 1 $MJ/m^2$, a countermeasure which raises the amount of solar radiation by 2 $MJ/m^2$, a countermeasure which lowers the amount of solar radiation by 1 $MJ/m^2$, and a countermeasure which lowers the amount of solar radiation by 2 $MJ/m^2$, etc. are examples of countermeasures for changing the amount of solar radiation within the cultivation site C1.

Furthermore, the influencing parameters may also include a chemical agent application parameter relating to chemical agent application at the cultivation site C1 of the produce, for example. A chemical agent application timing within the cultivation site C1, a chemical agent application amount within the cultivation site C1, or a type of chemical agent applied within the cultivation site C1, etc. may be used as the chemical agent application parameter, for example.

A countermeasure which expedites the application timing, and a countermeasure which delays the application timing, etc. are examples of countermeasures for changing the application timing within the cultivation site C1.

A countermeasure which raises the amount of application by 100 L per 1000 $m^2$, and a countermeasure which lowers the amount of application by 100 L per 1000 $m^2$, etc. are examples of countermeasures for changing the chemical agent application amount within the cultivation site C1.

A countermeasure which changes the chemical agent used to a chemical agent having a different effect from the effect of the chemical agent currently being used, etc. is an example of a countermeasure for changing the type of chemical agent applied within the cultivation site C1.

As mentioned above, the prediction unit 12a may also determine, as a candidate, a countermeasure governing changes to a plurality of influencing parameters. A countermeasure which raises the humidity within the cultivation site C1 by 5% and which raises the concentration of carbon dioxide within the cultivation site C1 by 5%, or a countermeasure which raises the air temperature within the cultivation site C1 by 1° C. and which expedites the application timing, etc. are examples of such countermeasures.

Here, weather conditions such as a change in the external air temperature or a change in the humidity of the external air are factors affecting the pest damage risk. The prediction unit 12a therefore preferably determines a plurality of countermeasure candidates on the basis of weather information (e.g., weather information for the current day, one day later and two days later) from the point of view of appropriately determining countermeasures for effectively reducing the pest damage risk as candidates.

In step S105 following step S104, the prediction unit 12a predicts the effect of reducing the pest damage risk for each of the plurality of countermeasure candidates.

The effect of reducing the pest damage risk means the extent to which the pest damage risk when a countermeasure has been undertaken (i.e., when there has been a change in the influencing parameter governed by the countermeasure) is reduced in relation to the pest damage risk when the countermeasure has not been undertaken (i.e., the pest damage risk predicted in step S102). In other words, a higher effect of reducing the pest damage risk leads to a greater reduction in the pest damage risk as a result of the countermeasure being undertaken.

Specifically, the prediction unit 12a predicts the risk of pest damage to the produce in the same way as in step S102 for each candidate, under a condition of assuming that there will have been a change in the influencing parameter governed by the countermeasure. For example, when the countermeasure which raises the humidity within the cultivation site C1 by 5% is determined as a candidate, the risk of pest damage to the produce is predicted for that candidate under a condition that the humidity within the cultivation site C1 will have risen by 5% in relation to the current humidity.

In step S106 following step S105, the selection unit 12b selects a countermeasure from among the plurality of countermeasure candidates on the basis of the result of predicting the effect of reducing the pest damage risk afforded by the prediction unit 12a. Specifically, the selection unit 12b makes the selection while prioritizing a countermeasure having a higher effect of reducing the pest damage risk.

FIG. 4 is a schematic diagram showing an example of the result of predicting the effect of reducing the pest damage risk afforded by the prediction unit 12a. A horizontal axis A1 in FIG. 4 is an axis for categorizing each of the countermeasure candidates, and a vertical axis A2 indicates the effect of reducing the pest damage risk.

The example illustrated in FIG. 4 shows five countermeasure candidates: candidate M1, candidate M2, candidate M3, candidate M4 and candidate M5. Each of the candidates has a different effect of reducing the pest damage risk, with the effect increasing in the order of: candidate M1, candidate M4, candidate M3, candidate M5, candidate M2. That is to say, candidate M2 has the highest effect of reducing the pest damage risk and candidate M1 has the lowest effect of reducing the pest damage risk.

The selection unit 12b selects the countermeasure having the highest effect of reducing the pest damage risk from among the plurality of countermeasure candidates, for example. In the example illustrated in FIG. 4, for example, the selection unit 12b selects the countermeasure corresponding to candidate M2 which has the highest effect of reducing the pest damage risk from among candidate M1, candidate M2, candidate M3, candidate M4 and candidate M5.

Here, the selection unit 12b preferably makes a selection by prioritizing a countermeasure having a higher effect of reducing the pest damage risk and then prioritizing a countermeasure which is implemented with less labour, from the point of view of reducing the risk of pest damage to the produce with less labour. In the example illustrated in FIG. 4, for example, the selection unit 12b may select a countermeasure corresponding to the candidate which is implemented with least labour from among candidate M2, candidate M3 and candidate M5 which are candidates for which the effect of reducing the pest damage risk is higher than a threshold TH. It should be noted that a candidate other than candidate M2 which has the highest effect of reducing the pest damage risk (i.e., candidate M3 or candidate M5) is also sometimes selected as a result.

Furthermore, the selection unit 12b preferably makes a selection by prioritizing a countermeasure having a higher effect of reducing the pest damage risk and then prioritizing a countermeasure which is implemented at a lower cost, from the point of view of reducing the risk of pest damage to the produce at a lower cost. In the example illustrated in FIG. 4, for example, the selection unit 12b may select a countermeasure corresponding to the candidate which is implemented at the lowest cost from among candidate M2, candidate M3 and candidate M5 which are candidates for which the effect of reducing the pest damage risk is higher than the threshold TH. It should be noted that a candidate other than candidate M2 which has the highest effect of reducing the pest damage risk (i.e., candidate M3 or candidate M5) is also sometimes selected as a result.

Moreover, the selection unit 12b may also select a countermeasure from among the plurality of countermeasure candidates while taking account of both labour and cost. For example, the selection unit 12b may make a selection which takes account of both labour and cost by using a first score which increases as the amount of labour decreases, and a second score which increases as the cost decreases. In the example illustrated in FIG. 4, for example, the selection unit 12b may determine the first score and the second score for each of the candidates M2, M3 and M5, which are candidates for which the effect of reducing the pest damage risk is higher than the threshold TH, and may then select the candidate from among candidate M2, candidate M3 and candidate M5 which has the smallest total value of the first score and the second score. In another example, the selection unit 12b may determine the first score and the second score for each of the candidates M2, M3 and M5, which are candidates for which the effect of reducing the pest damage risk is higher than the threshold TH, and may then select the candidate from among candidate M2, candidate M3 and candidate M5 which has the highest total value of the first score and the second score.

In step S107 following step S106, the communication unit 11 sends the result of the pest damage risk prediction and countermeasure information relating to the countermeasure selected by means of the selection unit 12b to the user terminal 20, and the processing flow shown in FIG. 3 ends.

The countermeasure information may include information indicating a change in the influencing parameter by the countermeasure selected by means of the selection unit 12b, for example. In this case, the information indicating a change in the influencing parameter by the countermeasure selected by means of the selection unit 12b is sent from the information processing server 10 to the user terminal 20, and displayed by means of the user terminal 20 in order to notify the user U1. For example, if the countermeasure which raises the humidity within the cultivation site C1 by 5% has been selected by the selection unit 12b, then information indicating that the humidity within the cultivation site C1 is to rise by 5% is sent from the information processing server 10 to the user terminal 20 in order to notify the user U1.

It should be noted that a plurality of influencing parameters may vary in conjunction with one another. For example, when there is a rise in temperature within the cultivation site C1, there generally tends to be a reduction in the humidity within the cultivation site C1. When the countermeasure selected by means of the selection unit 12b governs changes in a plurality of influencing parameters (e.g., the temperature within the cultivation site C1 and the humidity within the cultivation site C1) which vary in conjunction with one another, it is therefore possible to change one influencing parameter and thereby also change an influencing parameter other than that which is to be changed. Accordingly, in this case, the communication unit 11 may send information indicating only a change in one influencing parameter to the user terminal 20 as the countermeasure information. As a result, it is possible to restrict an excessively large amount of information being notified to the user U1, and therefore the user U1 will readily ascertain the action causing a change in the influencing parameter by the countermeasure selected by means of the selection unit 12b.

Furthermore, the countermeasure information may include information indicating an action to be undertaken by the user U1 to cause a change in an influencing parameter by the countermeasure selected by means of the selection unit 12b. In this case, the information indicating the action to be undertaken by the user U1 to cause a change in the influencing parameter by the countermeasure selected by means of the selection unit 12b is sent from the information processing server 10 to the user terminal 20 and displayed by means of the user terminal 20 in order to notify the user U1. For example, if the countermeasure which raises the humidity within the cultivation site C1 by 5% has been selected by the selection unit 12b, then information indicating the action of sprinkling water within the cultivation site C1 for a predetermined period (e.g., for 10 minutes) is sent from the information processing server 10 to the user terminal 20 in order to notify the user U1.

Here, a correspondence relationship between each countermeasure and the action undertaken by the user U1 to cause the change in the influencing parameter by the countermeasure may be set in various ways, as follows. It should be noted that the information processing server 10 may specifically perform processing relating to predicting the pest damage risk for a plurality of users, and this correspondence relationship may vary according to the user.

For example, the countermeasure which changes (i.e., raises or lowers) the humidity within the cultivation site C1 may correspond to the action of opening or closing a window in the cultivation site C1.

Furthermore, the countermeasure which changes (i.e., raises or lowers) the air temperature within the cultivation site C1 may correspond to the action of operating heating equipment within the cultivation site C1, or it may correspond to the action of opening or closing a window in the cultivation site C1, for example. Furthermore, the countermeasure which lowers the air temperature within the cultivation site C1 may correspond to the action of sprinkling water in a heating operation within the cultivation site C1.

Furthermore, the countermeasure which changes (i.e., raises or lowers) the concentration of carbon dioxide within the cultivation site C1 may correspond to the action of opening or closing a window in the cultivation site C1, for example. Furthermore, the countermeasure which raises the concentration of carbon dioxide within the cultivation site C1 may correspond to the action of operating a carbon dioxide generator within the cultivation site C1.

Furthermore, the countermeasure which changes (i.e., raises or lowers) the amount of solar radiation within the cultivation site C1 may correspond to the action of opening or closing a curtain provided in a window of the cultivation site C1, for example.

Furthermore, the countermeasure which changes (i.e., expedites or delays) the application timing within the cultivation site C1 may correspond to the action of applying a chemical agent at a changed application timing, for example.

Furthermore, the countermeasure which changes (i.e., raises or lowers) the amount of application of a chemical agent within the cultivation site C1 may correspond to the action of applying a chemical agent in a changed application amount, for example.

Furthermore, the countermeasure which changes the type of chemical agent applied within the cultivation site C1 may correspond to the action of applying a chemical agent of a changed type.

It should be noted that the text above described an example with reference to the flowchart in FIG. 3, where the effect of reducing the pest damage risk is predicted for all of the plurality of countermeasure candidates determined in step S104, but the prediction unit 12a may equally omit the prediction of the effect of reducing the pest damage risk for some of the plurality of countermeasure candidates determined in step S104, by using an existing optimization algorithm or the like. Specifically, the prediction unit 12a may use the result of predicting the effect of reducing the pest damage risk for several of the plurality of countermeasure candidates in order to omit a prediction of the effect of reducing the pest damage risk for countermeasure candidates expected to have a relatively low effect of reducing the pest damage risk. This makes it possible to reduce the processing load (e.g., the load of the prediction processing in step S105) of the information processing server 10.

Furthermore, the text above described a processing flow relating to a pest damage risk prediction premised on selecting any countermeasure from among a plurality of countermeasure candidates, but it is equally feasible for a countermeasure not to be selected from among a plurality of countermeasure candidates. For example, when none of the candidates has an effect of reducing the pest damage risk that satisfies a threshold (e.g., the threshold TH shown in FIG. 4), the selection unit 12b may determine that none of the candidates has an adequate effect of reducing the pest damage risk, and may not select a countermeasure from among the plurality of countermeasure candidates. In that case, the communication unit 11 may send to the user terminal 20 an indication that none of the candidates has an adequate effect of reducing the pest damage risk, or that there are no countermeasures which would effectively reduce the pest damage risk, for example. This makes it possible to incite the user U1 to investigate other plans for effectively reducing the pest damage risk.

Furthermore, the text above described an example in which one countermeasure is selected from among a plurality of countermeasure candidates, but the selection unit 12b may equally select two or more countermeasures (specifically, a smaller number of countermeasures than the number of candidates) from among a plurality of counter-measure candidates. In the example illustrated in FIG. 4, for example, the selection unit 12b may select three counter-measures respectively corresponding to candidate M2, candidate M3 and candidate M5 which are candidates for which the effect of reducing the pest damage risk is higher than the threshold TH. In this case also, it is possible to restrict the choice of actions undertaken by the user U1, so it is possible to cause the user U1 to take action for effectively reducing the pest damage risk. It is therefore possible to effectively reduce the risk of pest damage to the produce. It should be noted that the plurality of countermeasures selected may be a plurality of countermeasures that can be implemented simultaneously (e.g., a countermeasure which raises the humidity within the cultivation site C1 by 5% and a coun-termeasure which raises the amount of solar radiation by 1 MJ/m$^2$), or a plurality of countermeasures that cannot be implemented simultaneously (e.g., a countermeasure which raises the humidity within the cultivation site C1 by 5% and a countermeasure which raises the humidity within the cultivation site C1 by 10%).

Advantage of the Information Processing Server

The advantage of the information processing server 10 according to a mode of embodiment of the present invention will be described.

In the information processing server 10 according to this mode of embodiment, the prediction unit 12a predicts the effect of reducing the pest damage risk for each of a plurality of countermeasure candidates for changing at least one influencing parameter affecting the pest damage risk. The selection unit 12b then selects a countermeasure from among the plurality of countermeasure candidates while prioritizing a countermeasure having a higher effect of reducing the pest damage risk, on the basis of the result of predicting the effect of reducing the pest damage risk afforded by the prediction unit 12a. By this means, the user U1 can be made to take action that will cause a change in an influencing parameter for effectively reducing the pest dam-age risk (in other words, action to effectively reduce the pest damage risk). It is therefore possible to effectively reduce the risk of pest damage to the produce.

Furthermore, in the information processing server 10 according to this mode of embodiment, the selection unit 12b preferably makes a selection by prioritizing a counter-measure having a higher effect of reducing the pest damage risk and then prioritizing a countermeasure which is imple-mented with less labour. By this means, the user U1 can be made to take action that will cause a change in an influenc-ing parameter for effectively reducing the pest damage risk with less labour (in other words, action to effectively reduce the pest damage risk with less labour). It is therefore possible to reduce the risk of pest damage to the produce with less labour.

Furthermore, in the information processing server 10 according to this mode of embodiment, the selection unit 12b preferably makes a selection by prioritizing a counter-measure having a higher effect of reducing the pest damage risk and then prioritizing a countermeasure which is implemented at a lower cost. By this means, the user U1 can be made to take action that will cause a change in an influenc-ing parameter for effectively reducing the pest damage risk at a lower cost (in other words, action to effectively reduce the pest damage risk at a lower cost). It is therefore possible to reduce the risk of pest damage to the produce at a lower cost.

Furthermore, in the information processing server 10 according to this mode of embodiment, the output unit (e.g., the communication unit 11) preferably outputs countermea-sure information relating to the countermeasure selected by means of the selection unit 12b. By this means, the user U1 can be notified of countermeasure information relating to the countermeasure selected by means of the selection unit 12b. It is therefore possible to appropriately arrive at causing the user U1 to take action to effectively reduce the pest damage risk.

It should be noted that the text above described an example in which the communication unit 11 of the infor-mation processing server 10 functions as the output unit, but when the function of the information processor according to the present invention is realized by means of the user terminal 20, a display control unit (a functional unit for controlling operation of a display device) of the user termi-nal 20 may correspond to the output unit, for example. In this case, the display control unit of the user terminal 20 causes the display device to display the countermeasure information, for example.

Furthermore, in the information processing server 10 according to this mode of embodiment, the countermeasure information preferably includes information indicating a change in an influencing parameter by the countermeasure selected by means of the selection unit 12b. By this means, it is possible to notify the user U1 of information indicating a change in the influencing parameter by the countermeasure selected by means of the selection unit 12b. It is therefore possible to more appropriately arrive at causing the user U1 to take action to effectively reduce the pest damage risk.

Furthermore, in the information processing server 10 according to this mode of embodiment, the countermeasure information preferably includes information indicating an action to be undertaken by the user U1 to cause a change in an influencing parameter by the countermeasure selected by means of the selection unit 12b. By this means, it is possible to notify the user U1 of information indicating the action to be undertaken by the user U1 to cause a change in the influencing parameter by the countermeasure selected by means of the selection unit 12b. The user U1 can therefore ascertain the action for effectively reducing the pest damage risk more intuitively, so it is possible to even more appro-priately arrive at causing the user U1 to take action to effectively reduce the pest damage risk.

Furthermore, in the information processing server 10 according to this mode of embodiment, the prediction unit 12a preferably determines a plurality of countermeasure candidates on the basis of weather information (e.g., weather information for the current day, one day later and two days later). By this means, it is possible to determine the coun-termeasure candidate while taking account of weather (e.g., a change in the external air temperature or a change in the humidity of the external air, etc.) affecting the pest damage risk. It is therefore possible to appropriately determine a countermeasure for effectively reducing the pest damage risk as a candidate.

Furthermore, in the information processing server 10 according to this mode of embodiment, the influencing parameters preferably include an environmental parameter relating to the environment at the cultivation site C1 of the produce. By this means, it is possible to effectively reduce the pest damage risk by causing the user U1 to take action that will cause a change in the environmental parameter. It is therefore possible to appropriately arrive at effectively reducing the risk of pest damage to the produce. Furthermore, in the information processing server 10 according to this mode of embodiment, the influencing parameters preferably include a chemical agent application parameter relating to chemical agent application at the cultivation site C1 of the produce. By this means, it is possible to effectively reduce the pest damage risk by causing the user U1 to take action that will cause a change in the chemical agent application parameter. It is therefore possible to appropriately arrive at effectively reducing the risk of pest damage to the produce.

A preferred mode of embodiment of the present invention was described above with reference to the appended drawings, but the present invention is of course not limited to the abovementioned mode of embodiment, and it goes without saying that various modified examples or amended examples within the scope described in the patent claims also belong within the technical scope of the present invention.

For example, the processing described with the aid of the flowchart in the present specification need not necessarily be implemented in the order shown in the flowchart. A number of processing steps may be implemented in parallel. Furthermore, additional processing steps may be adopted, or some of the processing steps may be omitted.

Furthermore, for example, the series of control processes afforded by the information processing server 10 described above may be implemented by using any of software, hardware, or a combination of software and hardware. A program constituting the software is prestored in a recording medium provided internally or externally to the information processor.

KEY TO SYMBOLS

1 Information processing system
10 Information processing server (information processor)
11 Communication unit (output unit)
12 Control unit
12a Prediction unit
12b Selection unit
13 Memory unit
20 User terminal
30 Sensor device
40 Weather information server
C1 Cultivation site
U1 User

What is claimed is:

1. An information processor for predicting a risk of pest damage to produce, said information processor comprising:
a prediction unit in communication with: a user terminal of a user associated with the produce to receive, from the user terminal, a location of a cultivation site of the produce; a sensor device at the cultivation site of the produce to receive, from the sensor device, at least one environmental parameter relating to an environment at the cultivation site; and a weather information server to receive, from the weather information server, weather information for the cultivation site;
wherein the prediction unit is configured to:
predict, using a prediction model, an effect of reducing the pest damage risk for each of a plurality of countermeasure candidates for changing at least one influencing parameter affecting the pest damage risk to the produce based on the location of the cultivation site of the produce, the at least one environmental parameter relating to the environment at the cultivation site, and the weather information for the cultivation site, and wherein the at least one influencing parameter includes a chemical agent application parameter relating to application of a chemical agent at the cultivation site of the produce; and
rank the plurality of countermeasure candidates based on the effect of each of the countermeasure candidates for reducing the pest damage risk to the produce;
a selection unit configured to:
identify ones of the plurality of countermeasure candidates having an effect for reducing the pest damage risk to the produce that satisfies a threshold; and
select a countermeasure from among only the ones plurality of ranked countermeasure candidates that have an effect for reducing the pest damage risk to the produce that satisfies the threshold while prioritizing a countermeasure having a higher effect of reducing the pest damage risk, on the basis of a result of predicting the effect of reducing the pest damage risk afforded by the prediction unit; and
an output unit configured to transmit the selected countermeasure to the user terminal, wherein the selected countermeasure includes instructions to change the chemical agent application parameter;
wherein, in response to the transmittal of the selected countermeasure, the user terminal visually displays the change in the chemical agent application parameter to the user whereby the user applies the chemical agent at the cultivation site of the produce in accordance with the changed chemical application parameter.

2. The information processor according to claim 1, wherein the selection unit makes a selection by prioritizing a countermeasure having a higher effect of reducing the pest damage risk and then prioritizing a countermeasure which is implemented with less labor.

3. The information processor according to claim 1, wherein the selection unit makes a selection by prioritizing a countermeasure having a higher effect of reducing the pest damage risk and then prioritizing a countermeasure which is implemented at a lower cost.

4. The information processor according to claim 1, wherein the instructions to change the chemical agent application parameter include information indicating an action to be undertaken by the user to cause the change in the chemical agent application parameter.

5. The information processor according to claim 1, wherein the at least one influencing parameter further includes the environmental parameter relating to the environment at the cultivation site of the produce.

6. A method for reducing risk of pest damage to produce, the method comprising:
receiving, by a processor, a location of a cultivation site of the produce from a user terminal of a user associated with the produce, at least one environmental parameter relating to an environment at the cultivation site from a sensor device at the cultivation site, and weather information for the cultivation site from a weather information server;
predicting, by the processor, an effect of reducing the pest damage risk for each of a plurality of countermeasure candidates for changing at least one influencing parameter affecting the pest damage risk to the produce based on the location of the cultivation site of the produce, the at least one environmental parameter relating to the environment at the cultivation site, and the weather information for the cultivation site, wherein the at least one influencing parameter includes a chemical agent application parameter relating to application of a chemical agent at a cultivation site of the produce;

ranking, by the processor, the plurality of countermeasure candidates based on the effect of each of the countermeasure candidates for reducing the pest damage risk to the produce;

identifying, by the processor, ones of the plurality of countermeasure candidates having an effect for reducing the pest damage risk to the produce that satisfies a threshold;

selecting, by the processor, a countermeasure from among only the ones plurality of ranked countermeasure candidates that have an effect for reducing the pest damage risk to the produce that satisfies the threshold while prioritizing a countermeasure having a higher effect of reducing the pest damage risk, on the basis of a result of predicting the effect of reducing the pest damage risk afforded by the prediction unit;

transmitting the selected countermeasure to the user terminal, wherein the selected countermeasure includes instructions to change the chemical agent application parameter;

in response to the transmittal of the selected countermeasure, visually displaying the change in the chemical agent application parameter to the user; and applying the chemical agent at the cultivation site of the produce in accordance with the changed chemical application parameter.

7. A method for reducing risk of pest damage to produce, the method comprising:

acquiring, by a processor, an environmental parameter relating to an environment at a cultivation site of the produce from a sensor device at the cultivation site;

predicting, by the processor, an effect of reducing the pest damage risk for each of a plurality of countermeasure candidates for changing at least one influencing parameter affecting the pest damage risk, wherein the at least on influencing parameter includes the environmental parameter relating to the environment at the cultivation site of the produce;

selecting, by the processor, a countermeasure from among the plurality of countermeasure candidates while prioritizing a countermeasure having a higher effect of reducing the pest damage risk, on the basis of a result of predicting the effect of reducing the pest damage risk afforded by the prediction unit, wherein the selected countermeasure changes the environmental parameter; and in response to selecting the countermeasure, automatically changing, by the processor, the environmental parameter at the cultivation site of the produce in accordance with the selected countermeasure.

*    *    *    *    *